(12) United States Patent
Single et al.

(10) Patent No.: US 6,180,212 B1
(45) Date of Patent: Jan. 30, 2001

(54) SOFT TOUCH AUTOMOTIVE LATCH HANDLE

(75) Inventors: Arthur Single, Plymouth; Beth M. Wichterman, Ann Arbor; Daniel Ryan Malwitz, Carleton; Gerald Arthur Heath, Canton, all of MI (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 09/340,823

(22) Filed: Jun. 28, 1999

(51) Int. Cl.⁷ .............................. B32B 3/28; A47B 95/02; B29B 7/00
(52) U.S. Cl. .......................... 428/192; 428/157; 428/172; 428/213; 428/217; 16/110.1; 264/241; 264/297.2; 264/328.1
(58) Field of Search .................................. 428/141, 157, 428/172, 213, 192, 217; 16/110.1; 74/551.9; 296/146.7; 264/241, 297.2, 328.1

(56) References Cited

U.S. PATENT DOCUMENTS

| | | | |
|---|---|---|---|
| 5,037,687 | * 8/1991 | Kavgarzadeh et al. | 428/71 |
| 5,298,306 | 3/1994 | Miller | 428/68 |
| 5,412,839 | 5/1995 | McCollom | 16/111 R |

* cited by examiner

*Primary Examiner*—Donald Loney
(74) *Attorney, Agent, or Firm*—Larry I. Shelton

(57) ABSTRACT

Method of making an automotive latch handle intended for operation by manually pulling fingertips across a margin of the handle; it includes the steps of: a) molding a latch handle of a first essentially rigid plastic defining an area support for the margin, which plastic when fully solidified and cured has a stiffness of 0.8–5.8 GPa and a durometer ratio of 710,000 shore A; and b) overmolding the support area of the first plastic with a second plastic to define the margin, which margin when fully solidified and cured defines a finger gripping pad that has a stiffness of <0.01 GPa and a durometer ratio in the range of 35–85 shore A. An automotive latch handle structure that comprises: a) a generally flat paddle having means facilitating linear or pivotal movement, the paddle having been formed by molding of a first essentially rigid plastic with a stiffness of 0.8–5.8 Gpa; and b) an integrally overmolded second plastic defining a gripping pad for the fingers, the pad being molded to a margin of the paddle at least along one edge.

17 Claims, 4 Drawing Sheets

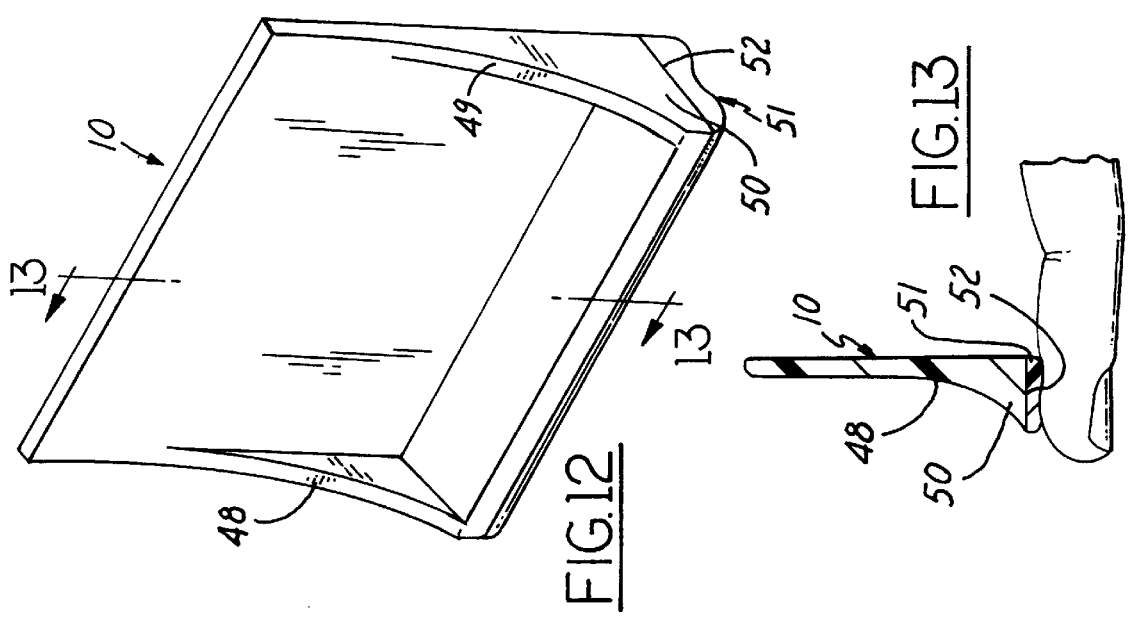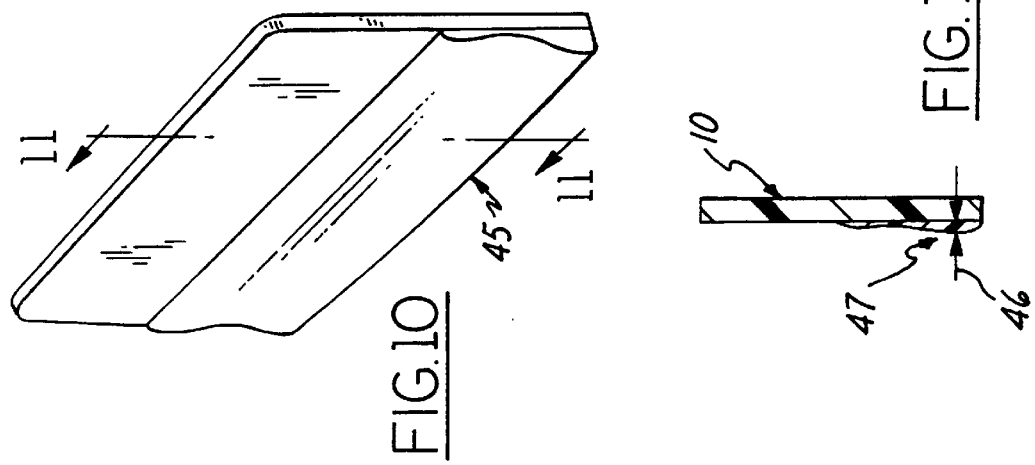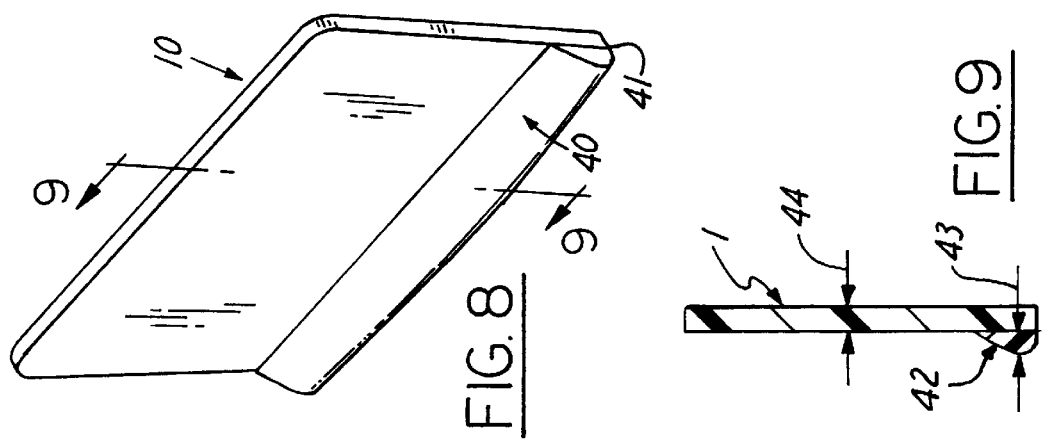

SOFT TOUCH AUTOMOTIVE LATCH HANDLE

TECHNICAL FIELD

This invention relates to manufacturing technology for creating ergonometric handles and more particularly to technology that provides a finger handle that feels soft to the touch but does not deflect excessively, does not deteriorate rapidly in use, does not require extra space to function, and has improved tactile feel in gripping effectiveness when pulled in a shearing direction.

DISCUSSION OF THE PRIOR ART

A common way to make handle designs for a soft feel is to use a hard, rigid core element over which is laid a foam layer of about one-half inch or greater, and thereafter covering the entire assembly with a thin, flexible cover. Unfortunately, the foam layer introduces too much deflection and the finger movement required when grasping the handle tends to distort control as a result of such deflection. The foam layer occupies too much space which is not consistent with the needs of recessed handles that limit the space of the recess.

In U.S. Pat. No. 5,298,306, an attempt was made to make a non-recessed automotive door handle by eliminating the use of foam and eliminating the necessity for complete encapsulation. The core in a soft plastic skin was used to replace the flexible cover of the prior art. Since the skin is uniform in thickness, its shape is dictated by the shape of the hard core; this limited its ability to provide ergonomic improvement in local areas or regions and caused the total assembly cost to be rigidly high.

SUMMARY OF THE INVENTION

It is an object of this invention to provide a process for making generic latch handles that ergonomically improve the gripping contact and feel between the latch handle and the fingers operating the latch handle.

An aspect of this invention that meets the above object comprises a method of making an automotive latch handle intended for operation by manually pulling fingertips across a margin of the handle, the process including the steps of: a) molding a latch handle of a first essentially rigid plastic defining an area support for the margin, which plastic when fully solidified and cured has a stiffness of 0.8–5.8 GPa and a durometer ratio of 710,000 shore A; and b) overmolding the support area of the first plastic with a second plastic to define the margin, which margin when fully solidified and cured defines a finger gripping pad that has a stiffness of <0.01 GPa and a durometer ratio in the range of 35–85 shore A.

Another aspect of this invention that meets the above object is an automotive latch handle structure that comprises: a) a generally flat paddle having means facilitating linear or pivotal movement, the paddle having been formed by molding of a first essentially rigid plastic with a stiffness of 0.8–5.8 Gpa; and b) an integrally overmolded second plastic defining a gripping pad for the fingers, the pad being molded to a margin of the paddle at least along one edge.

BRIEF DESCRIPTION OF THE DRAWINGS

FIGS. 6, 8, 10 and 12 are elevational side views of paddle handles depicting alternative embodiments of this invention and showing variations in the shape and placement of the second plastic and/or the first plastic; and FIGS. 7, 9, 11 and 13 are respectively perspective views of the alternative embodiment structures of FIGS. 6, 8, 10 and 12.

DETAILED DESCRIPTION AND BEST MODE

Figure 1:
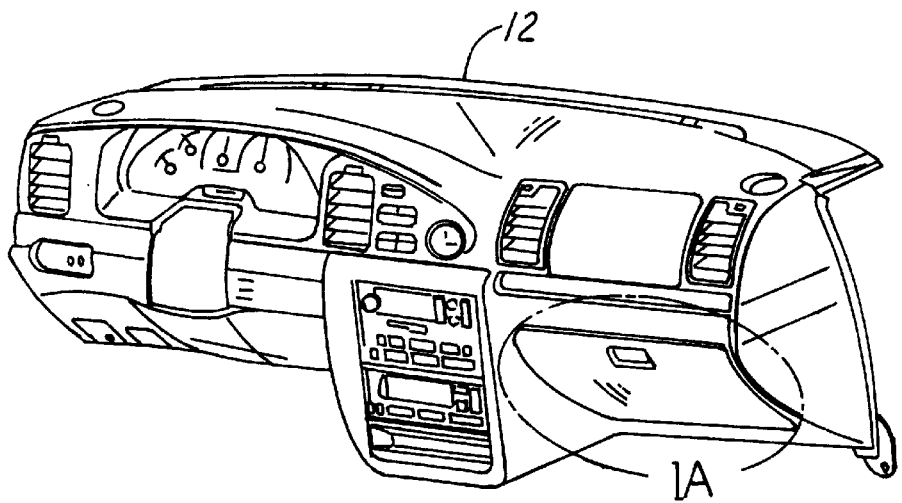
FIG. 1 is an elevational frontal view of one embodiment of the apparatus aspect of this invention, showing an automotive glove box and its recessed paddle handle.
Figure 1A:
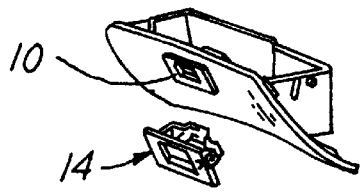

Most current automotive latch handles are molded of plastic and frequently have a paddle type handle assembly 50 at the top of a recessed cavity 51, such as illustrated for the glove box door 52 in an automotive front assembly 53 (FIG. 1). The operator's fingers reach underneath the paddle handle and pull the paddle handle along its bottom edge.

Due to molding restrictions imposed by the injection molding process and the choice of plastic, the paddle handle is usually restricted to a generally uniform cross-sectional thickness which creates an uncomfortable and sometimes hard scraping feeling to the finger touch as the fingers pull on the paddle edge.

Figure 2:
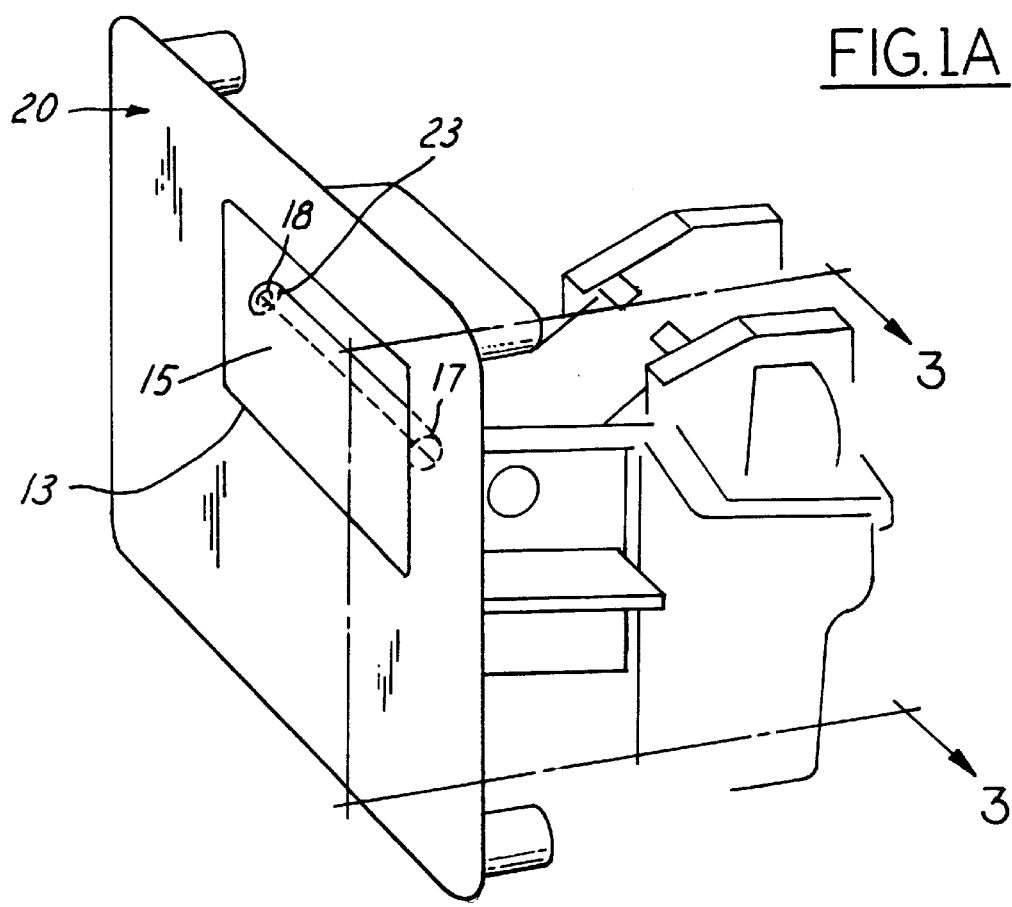
FIG. 2 is an enlarged sectional view taken along line 2—2 of FIG. 1.
Figure 3:
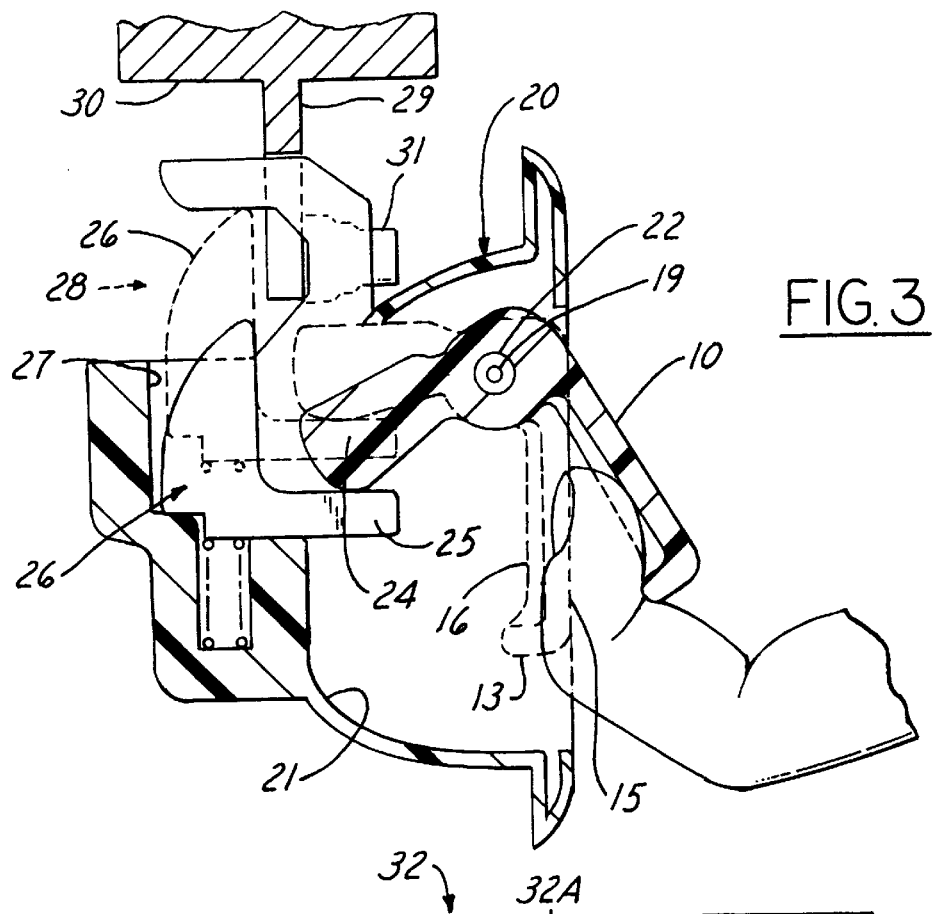
FIG. 3 is a schematic illustration of how a finger must actuate the processed paddle handle of FIGS. 1 and 2 without the benefit of this invention.

The latch handle is part of a latching assembly which includes, as shown in FIGS. 2 and 3, a paddle handle 10 having an exposed flat surface 15 with shallow fringe ribbing 16 and a pair of opposed pivot journals 17, 18 (or pins) to define a pivot axis 19. A housing 20, having walls 21 defining a recess, carries openings 22, 23 for respectively receiving the handle's pivot journals 17, 18. The paddle handle also has a molded striker arm 24 extending radially outwardly from the pivot axis 19 to engage a complementary arm 25 of the latch 26 that slides in a track 27 tangential to the pivot axis 19. The latch is spring-urged normally to a raised position 28 (as shown in FIG. 3) to latch with a catch 29 stationed and protruding downwardly from the glove compartment wall 30. A resilient pad 31 may be used to assist the latching action of the latch to the catch.

To provide an economical recessed automotive handle that has a soft grip and shearing tactile feel, the handle 10 is first injection molded with a first plastic 11 to define the handle as well as an area support for the margin 14 of the handle that will be touched and gripped by the operator's fingertips. When fully solidified and cured, the first plastic 11 will have a stiffness of about 0.8–5.8 GPa and a durometer rating of about >10,000 shore A. Then, a second plastic 13 is injection overmolded upon the first plastic to define the margin or region 14 for the fingers to contact. When the second plastic is fully solidified and cured, it will have a stiffness of about <0.01 GPa and a durometer ratio of about 35–85 shore A.

Figure 4:
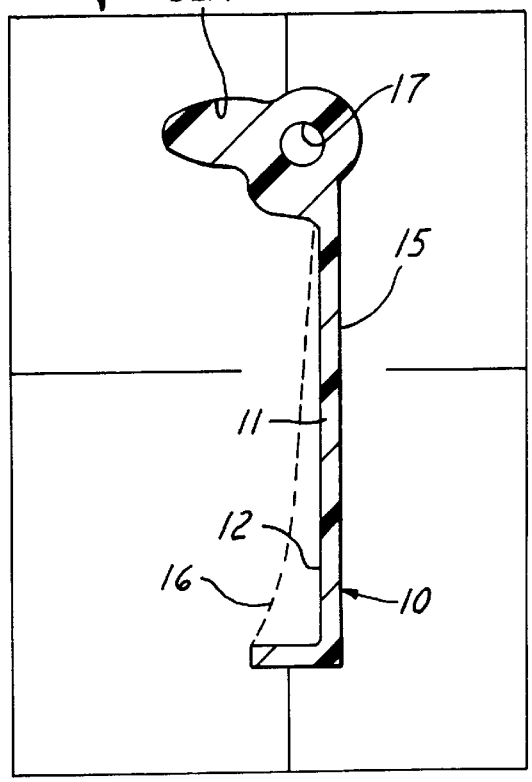
FIG. 4 is a central elevational sectional view of an injection mold showing its cavity filled with the first plastic material to define the paddle handle substrate.
Figure 5:
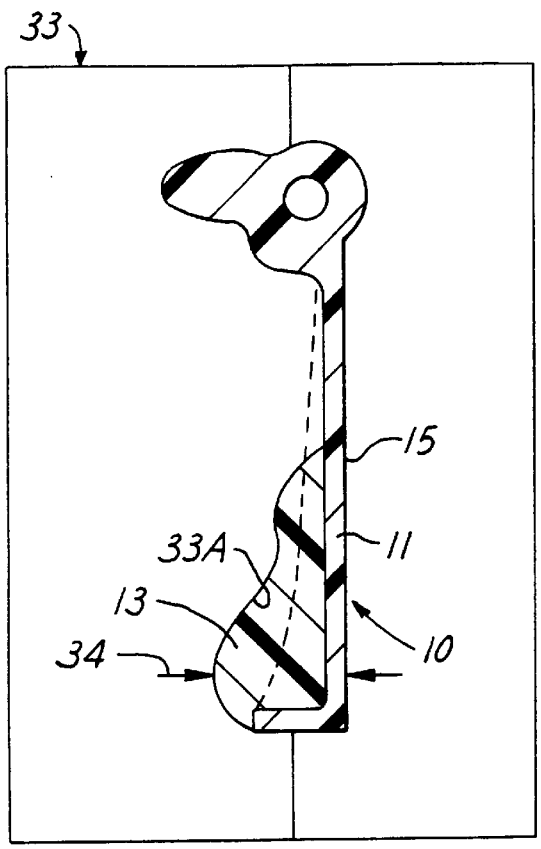
FIG. 5 is a view similar to FIG. 4 but showing another mold for injecting the second plastic around the previously molded first plastic that was previously shown in FIG. 4.

FIG. 4 illustrates schematically how this first injection molding step can be carried out using a first mold 32 with a die cavity 32A which defines the paddle handle 10 with a flat surface 15, ribbing 16, pivot journals 17, 18, and the actuating arm 24. The thickness of the paddle or flat section is about 2.5 mm. and the surrounding ribbing is limited to a height of about 5.0 mm.

Next, an injection overmolding step is carried out in another mold 33 having a cavity 33A that uses the solidified first plastic 11 as an insert to define the molding space. The second plastic 13, of soft high grip properties, is molded and bonded during the second injection molding process to the first plastic to define the margin 14, which when fully solidified and cured, becomes a finger gripping pad that has the above suggested stiffness and durometer rating. The combined thickness 34 of the paddle handle and pad now become quite thick at the region of the margin, in opposition to what the prior art can provide. The second plastic 13 is preferably thermoplastic urethane or an elastomer; however, it is advantageous to choose chemical and physical compatibility between the first and second plastics. For example, if polycarbonate ABS is selected as the first plastic (having a cured stiffness of 1.0–3.5 GPa and a durometer ratio of >10,000 shore A), it is advisable to select thermoplastic polyurethane as the second plastic for best adhesion with the first plastic. If polypropylene is selected as the first plastic because of its recyclability and lower cost (having a somewhat lower stiffness), it is desirable to select a thermoplastic elastomer (TPE) for a desirable combination of adhesion and recyclability.

The first plastic 11 is a hard, stiff, and relatively strong plastic that deflects little under a test load of about 50 Newtons. The second plastic 13 similarly deflects little under pressure, but nonetheless has a soft feel or tactile touch. The durometer rating should desirably be in the range of 35–85 shore A. In his range, the second plastic will not have a spongy property, but rather a surface friction such that when the operator's fingers are pulled along the second plastic's exposed surface in a shearing or tangential direction, a comfortable but secure grip is felt with the handle.

It may be advantageous, from a manufacturing productivity and adhesion standpoint, to begin the second overmolding step when the first plastic has solidified but not yet become fully hard. The first plastic, in such state, is transferred to the second injection molding die to do so.

Figure 7:
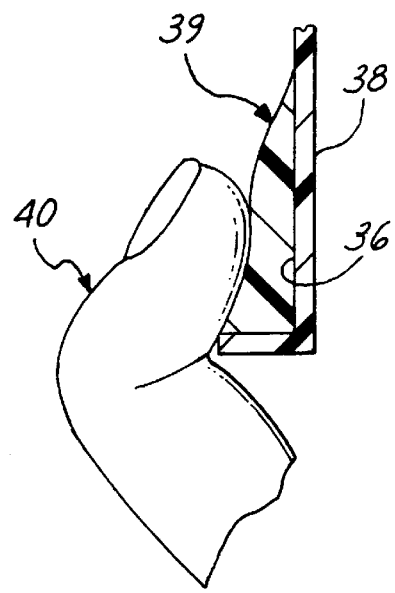
Figure 6:
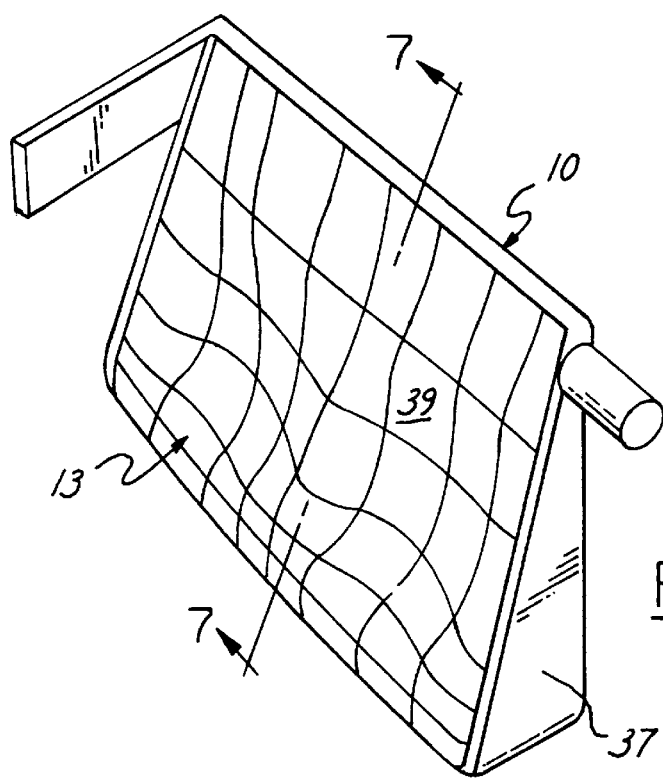

As shown in FIGS. 6 and 7, the second plastic can be overmolded into a hidden area 36 on the backside of the paddle handle 10; such interior area 36, being defined by a rib 37 at right angle to the flat planar paddle 38 of the handle, creates a secure molding-in deposit area. In this position, the second plastic 13 need not be colored to match the color of the first plastic. Desirably, the second plastic is given an ergonometric shape 39 with contours that mate with the contours of an average adult finger 40, as shown in FIG. 7.

The physical properties of the second plastic can be varied to achieve different levels of tactile feel through shape, surface finish and chemical composition. Shape can, for example, be varied as shown in FIGS. 8–13. In FIGS. 8 and 9, the ribbing can be eliminated and the second plastic 13 applied as an injection molding 40 elongated along the edge 41 of the paddle 10 and has a cross-sectional tear-drop shape 42 that mates with the fold at the first joint of the operator's finger. The second overmolding will have a maximum thickness 43 of about 5 mm., about equivalent to the thickness 44 of the first plastic, but can be even greater in thickness. The grip effect is felt mostly from wrapping the fingers around the tear-drop shape. In this configuration, the side of the second molding 40 will be exposed and may be colored to match the first plastic.

In FIGS. 10 and 11, a much wider second injection molding 45 is created having a thinner thickness 46 which has a broader area for the fingertips to shearingly feel the surface of the second molding. Molding 45 also has a slight ergonometric contour 47. The durometer ratio of this second molding of FIGS. 10 and 11 desirably is higher, in the range of 50–60.

In FIGS. 12 and 13, the paddle handle 10 has sloping side ribs 48–49 which meet with an end rib 50. The overmolded plastic 51 is laid and bonded only to the edge 52 surface, allowing the handle assembly to be designed with a different need for finger recess. Here, the fingertips press and shearingly contact a contoured surface that is perpendicular to the plane of the paddle handle.

While the invention has been shown and described in its preferred embodiments, it will be clear to those skilled in the arts to which it pertains that many changes and modifications may be made thereto without departing from the scope of the invention.

We claim:

1. A method of making an automotive latch handle intended for operation by manually pulling fingertips across a margin of the handle, the process comprising:
   a) molding a latch handle of a first plastic defining a support area for the margin, which plastic when fully solidified and cured has a stiffness of 0.8–5.8 GPa and a durometer ratio of >10,000 shore A; and
   b) overmolding said support area of the first plastic with a second plastic to define said margin,
   which margin, when fully solidified and cured, defines a finger gripping pad that has a stiffness of <0.01 GPa and a durometer ratio in the range of 35–85 shore A.

2. The method as in claim 1, in which the combined thickness of said first plastic and second plastic along the length of said latch handle varies.

3. The method as in claim 2, in which said variable thickness is in the range of 0.5–5.0 mm.

4. The method as in claim 1, in which said second plastic is selected to have a composition that deflects no more than 10% when pulled by fingers to operate said handle.

5. The method as in claim 1, in which step b) is carried out by a separate injection molding die in which the first plastic is placed as an element of the die assembly.

6. The method as in claim 1, in which said first plastic is selected from the group consisting of nylon (polyamid) polycarbonate, ABS, of polycarbonate/ABS and polypropylene, and the second plastic is selected as thermoplastic urethane or thermoplastic elastomer.

7. The method as in claim 1, in which said first plastic is molded with either undercut surfaces or openings into which the second plastic may be injection molded to provide a mechanical lock to the first plastic.

8. The method as in claim 1, in which said second plastic is provided with a contoured outer exposed shape that is ergonomically contoured to accept the tactile contact of a finger.

9. The method as in claim 1, in which said second plastic has an exposed surface contoured and molded for receiving the shape of a finger.

10. The method as in claim 1, in which said second plastic margin is located on an area of said first plastic which is generally hidden from view and said second plastic having a natural process color without the necessity to add coloring.

11. The method as in claim 1, in which step b) is carried out when the resin plastic of step a) is solidified but not fully hard.

12. The method as in claim 1, in which the second plastic is selected to have varying physical properties to achieve different softness and tactile feel through shape or surface finish or chemical composition.

13. An automotive latch handle, comprising:
a) a generally flat paddle having means facilitating pivotal movement, said paddle having been formed by injection molding of a first essentially rigid plastic having a stiffness of 0.8–5.8 GPa; and
b) an integrally overmolded second plastic defining a gripping pad for finger operation, the pad being molded to a margin of the paddle at least along one edge.

14. The latch handle as in claim 13 in which said integrally overmolded second plastic presents a secure non-slippery soft touch when contacted and having a contoured surface defining a hidden margin when the paddle is in a latched condition.

15. The latch handle as in claim 13, in which the overmolded second plastic has a variable thickness and has a shaped cross section to mate smoothly and ergonomically with a human fingertip when bent slightly around said edge thereby imposing a shearing grip.

16. The latch handle as in claim 13, in which the second plastic margin is an exposed edge surface and has a variable cross section to mate with a human finger when placed in a shearing grip across said overmolded plastic.

17. The latch handle as in claim 13, in which the combined thickness of said first and second plastics varies in the range of 0.5–5.0 mm. along the length of said latch handle.

* * * * *